US008275933B2

(12) United States Patent
Flynn et al.

(10) Patent No.: US 8,275,933 B2
(45) Date of Patent: Sep. 25, 2012

(54) APPARATUS, SYSTEM, AND METHOD FOR MANAGING PHYSICAL REGIONS IN A SOLID-STATE STORAGE DEVICE

(75) Inventors: David Flynn, Sandy, UT (US); Jonathan Thatcher, Liberty Lake, WA (US); Joshua Aune, South Jordan, UT (US); Robert Barry Wood, Niwot, UT (US)

(73) Assignee: Fusion-10, Inc, Salt Lake City, UT (US)

( * ) Notice: Subject to any disclaimer, the term of this patent is extended or adjusted under 35 U.S.C. 154(b) by 398 days.

(21) Appl. No.: 12/616,112

(22) Filed: Nov. 10, 2009

(65) Prior Publication Data

US 2010/0122019 A1    May 13, 2010

Related U.S. Application Data

(60) Provisional application No. 61/112,940, filed on Nov. 10, 2008.

(51) Int. Cl.
*G06F 13/14* (2006.01)
(52) U.S. Cl. .................. 711/103; 711/112; 711/154
(58) Field of Classification Search .................. None
See application file for complete search history.

(56) References Cited

U.S. PATENT DOCUMENTS

| | | | |
|---|---|---|---|
| 4,468,759 A | 8/1984 | Kung et al. | |
| 6,373,758 B1 | 4/2002 | Hughes et al. | |
| 6,381,176 B1 | 4/2002 | Kim et al. | |
| 6,675,281 B1 | 1/2004 | Oh et al. | |
| 6,728,910 B1 | 4/2004 | Huang | |
| 6,731,552 B2 | 5/2004 | Perner | |
| 6,732,221 B2 | 5/2004 | Ban | |
| 6,876,590 B2 | 4/2005 | Joachim et al. | |
| 6,940,774 B2 | 9/2005 | Perner | |
| 6,950,353 B1 | 9/2005 | Kim et al. | |
| 7,080,232 B2 | 7/2006 | Aasheim et al. | |
| 7,120,729 B2 | 10/2006 | Gonzalez et al. | |
| 7,139,863 B1 | 11/2006 | Defouw et al. | |
| 7,139,896 B2 | 11/2006 | Wong | |
| 7,248,515 B2 | 7/2007 | Chevallier | |
| 7,299,381 B2 | 11/2007 | Tandjoeng | |
| 7,411,848 B2 | 8/2008 | Gatzemeier et al. | |
| 7,441,067 B2 | 10/2008 | Gorobets et al. | |
| 2003/0021170 A1 | 1/2003 | Perner | |
| 2004/0090853 A1 | 5/2004 | Perner | |
| 2005/0216687 A1 | 9/2005 | Fu | |

(Continued)

OTHER PUBLICATIONS

ASPMC_660, Asine Group, http://www.asinegroup.com/products/aspmc660.html, copyright 2002, downloaded on Nov. 18, 2009.

(Continued)

*Primary Examiner* — Than Nguyen
(74) *Attorney, Agent, or Firm* — Kunzler Law Group, PC

(57) ABSTRACT

An apparatus, system, and method are disclosed for managing physical regions in a solid-state storage device. The definition module defines a physical storage region on solid-state storage media of a solid-state storage device. The physical storage region includes a subset of total physical storage capacity on the solid-state storage media. The storage controller performs memory operations within the physical storage region such that the memory operations are bounded to the physical storage region. The implementation module implements the physical storage region definition with respect to the storage controller for the solid-state storage media.

19 Claims, 10 Drawing Sheets

U.S. PATENT DOCUMENTS

| | | |
|---|---|---|
| 2007/0050536 A1 | 3/2007 | Kolokowsky |
| 2007/0058466 A1 | 3/2007 | Joshi et al. |
| 2007/0103992 A1 | 5/2007 | Sakui et al. |
| 2007/0204128 A1 | 8/2007 | Lee et al. |
| 2008/0225598 A1 | 9/2008 | Jung et al. |
| 2008/0228995 A1 | 9/2008 | Tan et al. |
| 2008/0270680 A1 | 10/2008 | Chang |
| 2008/0279004 A1 | 11/2008 | Prasad |
| 2008/0301256 A1 | 12/2008 | McWilliams et al. |
| 2008/0313364 A1 | 12/2008 | Flynn et al. |
| 2009/0210620 A1* | 8/2009 | Jibbe et al. ............ 711/114 |
| 2009/0292861 A1* | 11/2009 | Kanevsky et al. ......... 711/103 |
| 2010/0036999 A1* | 2/2010 | Zhuang et al. ........... 711/103 |
| 2010/0049914 A1* | 2/2010 | Goodwin ............... 711/114 |
| 2010/0070729 A1* | 3/2010 | Ng et al. ............... 711/166 |
| 2010/0293331 A1* | 11/2010 | Fujii et al. ............. 711/119 |

OTHER PUBLICATIONS

BiTMICRO Introduces E-Disk PMC Flash Disk Module at Military & Aerospace Electronics East, May 18, 2004, BiTMICRO, http://www.bitmicro.com/press_news_releases_20040518_prt.php.

NAND Flash 101: An Introduction to NAND Flash and How to Design It in to Your Next Product, Micron, pp. 1-28, Micron Technology Nov. 2006.

* cited by examiner

APPARATUS, SYSTEM, AND METHOD FOR MANAGING PHYSICAL REGIONS IN A SOLID-STATE STORAGE DEVICE

CROSS-REFERENCES TO RELATED APPLICATIONS

This application claims priority to U.S. Provisional Patent Application No. 61/112,940 entitled "Apparatus, System, and Method for Reduced Physical Region in a Storage Device" and filed on Nov. 10, 2008 for David Flynn, et al., which is incorporated herein by reference.

BACKGROUND

1. Field of the Invention

This invention relates to data storage and more particularly relates to managing physical regions in a solid-state storage device.

2. Description of the Related Art

Solid-state storage, such as NAND flash memory, typically "wears out" after a certain number of program/erase cycles on the storage. As the number of program/erase cycles nears the threshold level for the storage, the data written or retrieved from the storage may contain errors. However, depending on the type of solid-state storage, the number of program/erase cycles required to wear out the storage may range from 1,000 to 1,000,000 cycles. Furthermore, solid-state storage devices often use one or more "wear-leveling" techniques that may or may not include writing data to the solid-state storage device in such a manner as to prolong the life of the solid-state storage media by writing data evenly across the storage media, or writing data to various locations across the storage to distribute the wear on the storage media.

Consequently, while this lifespan is appealing to a typical end-user who desires to obtain as much use from a solid-state storage device as possible, the great number of program/erase cycles and effects of a solid-state storage device's wear leveling techniques makes testing to verify manufacturers advertised lifespan assertions difficult to test as such tests may take months or years of continuous data writing to complete.

SUMMARY

The present invention has been developed in response to the present state of the art, and in particular, in response to the problems and needs in the art that have not yet been fully solved by currently available storage systems. Accordingly, the present invention has been developed to provide an apparatus, system, and method for managing physical regions in a solid-state storage device that overcome many or all of the above-discussed shortcomings in the art.

The apparatus to managing physical regions in a solid-state storage device is provided with a plurality of modules configured to functionally execute the necessary steps of defining a physical storage region on solid-state storage media, performing memory operations within the physical storage region, and implementing the physical storage region definition. The apparatus includes a storage controller and a definition module and an implementation module.

The definition module defines a physical storage region on solid-state storage media of a solid-state storage device. The physical storage region includes a subset of total physical storage capacity on the solid-state storage media. In one embodiment, the definition module defines one or more additional physical storage regions on the solid-state storage media of the solid-state storage device. Each additional physical storage region includes a distinct subset of the total physical storage capacity on the solid-state storage media. In certain embodiments the physical storage region includes a set of logical erase blocks, each logical erase block referenced by the storage controller.

The storage controller performs memory operations within the physical storage region such that the memory operations are bounded to the physical storage region. In one embodiment, the storage controller sequentially writes data on the solid-state storage media in a log structured format and the data is sequentially stored on the solid-state storage media.

The implementation module implements the physical storage region definition with respect to the storage controller for the solid-state storage media. In one embodiment, the implementation module includes a region assignment module that assigns the physical storage region to the storage controller. In another embodiment, the implementation module includes a redirection module that redirects memory operations to the physical storage region.

In one embodiment, the apparatus includes a thread module that initiates an autonomous set of memory operations within each of the physical storage region and the one or more additional physical storage regions. In certain embodiments, the apparatus includes a sampling module that determines that physical storage capacity of the physical storage region is statistically significant with respect to the total physical storage capacity. In one embodiment, the apparatus includes a parameter module that manages one or more parameters for the physical storage region. The parameters include one or more of security parameters, quality of service parameters, and performance parameters.

A method is also presented for managing physical regions in a solid-state storage device that includes the necessary steps to execute the functions described above in relation to the apparatus. Additionally, a second method is presented for managing physical regions in a solid-state storage device similar to the method described above. In addition, the second method includes exercising the physical storage region by performing memory operations on the physical storage region. The method also includes determining data integrity in the physical storage region.

In one embodiment, the method includes extrapolating the data integrity in the physical storage region to the total physical storage capacity on the NAND flash storage media. In certain embodiments, the method includes initiating one or more software threads to perform an autonomous set of memory operations within each of the physical storage regions. In a further embodiment, each of the software threads performs memory operations according to a testing profile that specifies one or more of a number of operations, type of operations, host driver, wear leveling algorithm, data write pattern, and workload.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
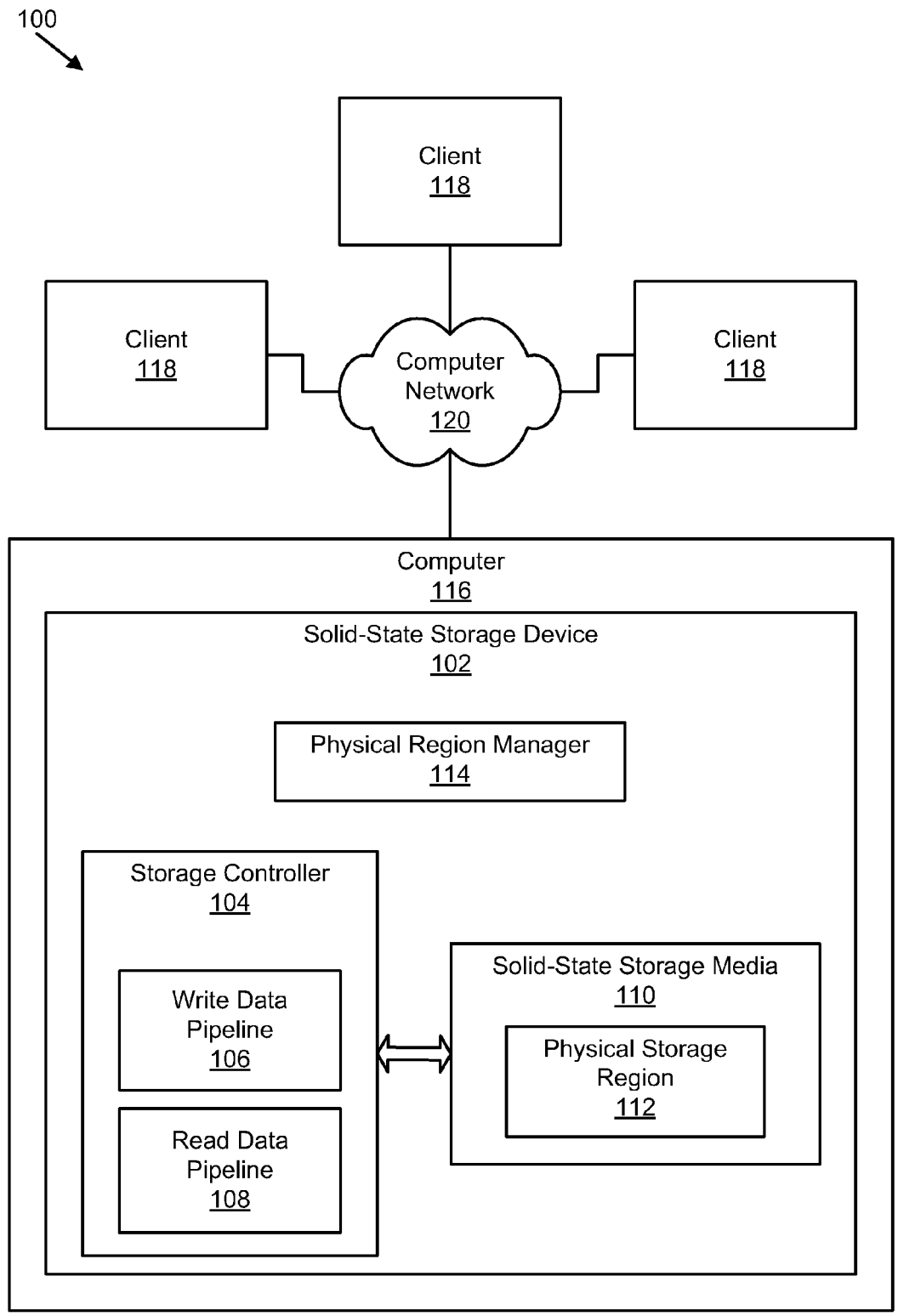
FIG. 1 is a schematic block diagram illustrating one embodiment of a system for managing physical regions in a solid-state storage device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist on a system or network. A software module or a portion of a software module is stored in a computer readable medium.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of a system 100 for managing physical regions in a solid-state storage device. The system 100 includes a solid-state storage device 102, a solid-state storage controller 104, a write data pipeline 106, a read data pipeline 108, a solid-state storage media 110, a physical storage region 112, a physical region manager 114, a computer 116, a client 118, and a computer network 120, which are described below. The solid-state storage device 102, the solid-state storage controller 104, the write data pipeline 106, the read data pipeline 108, and the solid-state storage media 110 are described in more detail in U.S. patent application Ser. No. 11/952,091, filed on Dec. 6, 2007, titled "APPARATUS, SYSTEM, AND METHOD FOR MANAGING DATA USING A DATA PIPELINE," to David Flynn, et al. [hereinafter "Managing Data Using a Data Pipeline"], which is incorporated herein by reference.

The system 100 includes at least one solid-state storage device 102. In another embodiment, the system 100 includes two or more solid-state storage devices 102. Each solid-state storage device 102 may include non-volatile, solid-state storage media 110 such as NAND flash memory, nano random access memory ("nano RAM or NRAM"), magneto-resistive RAM ("MRAM"), dynamic RAM ("DRAM"), phase change RAM ("PRAM"), multi-level cell ("MLC") memory, single-level cell ("SLC") memory, single mode level cell ("SMLC") memory, and the like. The solid-state storage device 102 is depicted in a computer 116.

In one embodiment, the solid-state storage device 102 is internal to the computer 116 and is connected using a system bus, such as a peripheral component interconnect ("PCI") express bus, a Serial Advanced Technology Attachment ("serial ATA") bus, or the like. In another embodiment, the solid-state storage device 102 is external to the computer 116 and is connected, a universal serial bus ("USB") connection, an Institute of Electrical and Electronics Engineers ("IEEE") 1394 bus ("FireWire"), or the like. In other embodiments, the solid-state storage device 102 is connected to the computer 116 using a peripheral component interconnect ("PCI") express bus using external electrical or optical bus extension or bus networking solution such as Infiniband or PCI Express Advanced Switching ("AS"), or the like.

In one embodiment, the solid-state storage device 102 is in the form of a dual-inline memory module ("DIMM"). In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104, each may include a write data pipeline 106 and a read data pipeline 108 and each includes a solid-state storage 110 as described in more detail in Managing Data Using a Data Pipeline. In one embodiment, the storage controller 104 maps logical identifiers to physical addresses of data stored on solid-state storage media 110 of a solid-state storage device 102. This mapping allows data to be referenced in a logical address space using logical identifiers. A logical identifier does not indicate the physical location of data on the storage, but is an abstract reference to the data. The solid-state storage device 102 manages the physical addresses in the physical address space. Therefore, contiguous logical identifiers may in fact be stored in non-contiguous physical addresses as the solid-state storage device 102 determines the location to perform writes of data. Furthermore, in one embodiment, the logical address space is substantially larger than the physical address space. This "thinly provisioned" embodiment, allows the number of logical identifiers for data references to greatly exceed the number of possible physical addresses.

In one embodiment, the storage controller 104 sequentially writes data on the solid-state storage media 110 in a log structured format and the data is sequentially stored on the solid-state storage media 110. Sequentially writing data involves the storage controller 104 streaming data packets into storage write buffers for storage elements, such as a chip (a package of one or more dies) or a die on a circuit board. When the storage write buffers are full, the data packets are written to a designated virtual or logical page ("LP"). Data packets then refill the storage write buffers and, when full, the data packets are written to the next LP. This process continues, LP after LP, typically until a virtual or logical erase block ("LEB") is filled. LPs and LEBs are described in more detail below.

In another embodiment, the streaming may continue across LEB boundaries with the process continuing, LEB after LEB. Typically, the storage controller 104 sequentially stores data packets in an LEB by order of processing. In one embodiment, where a write data pipeline 106 is used, the storage controller 104 stores packets in the order that they come out of the write data pipeline 106. This order may be a result of data segments arriving from a requesting device mixed with packets of valid data that are being read from another storage division as valid data is being recovered from another LEB during a recovery operation.

The sequentially stored data may act as a log to reconstruct data indexes and other metadata using information from data packet headers. For example, in one embodiment, the storage controller 104 may reconstruct an object index by reading headers to determine the object to which each packet belongs and sequence information to determine where in the object the data or metadata belongs. The storage controller 104 uses physical address information for each packet and timestamp or sequence information to create a mapping between the physical locations of the packets and the object identifier and data segment sequence. Timestamp or sequence information is used by the storage controller 104 to replay the sequence of changes made to the index and thereby typically reestablish the most recent state.

In one embodiment, erase blocks are time stamped or given a sequence number as packets are written and the timestamp or sequence information of an erase block is used along with information gathered from container headers and packet headers to reconstruct the object index. In another embodiment, timestamp or sequence information is written to an erase block when the erase block is recovered.

The solid-state storage device 102 includes solid-state storage media 110 as described above. In one embodiment, the solid-state storage media 110 is an array of non-volatile solid-state storage elements arranged in banks, and accessed in parallel through a bi-directional storage input/output ("I/O") bus. Furthermore, the solid-state storage media 110 may include one or more physical storage regions 112. As will be described hereafter, a physical storage region 112, in one embodiment, is a subset of a total physical storage capacity on the solid-state storage media 110.

The solid-state storage device 102 includes a physical region manager 114. In one embodiment, the physical region manager 114 resides inside the solid-state storage device 102.

In some embodiments, the physical region manager 114 resides on the storage controller 104. In another embodiment, the physical region manager 114 is external to the solid-state storage device 102 such as on the computer 116, or another device operationally coupled to the solid-state storage device 102. The physical region manager 114, in one embodiment, manages operations of the solid-state storage device on a physical storage region 112. As used herein, a physical storage region 112 is a subset of physical storage capacity on the solid-state storage media 110 and represents one or more memory cells on the solid-state storage media 110. In one embodiment, physical storage capacity is total physical storage capacity. The total physical storage, in one embodiment is the entire storage capacity on the solid-state storage media 110 including all of the memory cells on the solid-state storage media.

In another embodiment, total physical storage capacity is the total useable storage capacity of the solid-state storage media 110 including the memory cells available for storage operations of user data. The total useable storage capacity may not include portions of the solid-state storage media 110 that are reserved by the storage controller 104 for metadata or management operations such as garbage collection, PEB swapping, and the like. Typically, total useable storage capacity, representing the storage capacity available for user data, is currently approximately 80% of the entire physical capacity. The 20% difference may include system space (for metadata), overhead (such as for ECC and parity) and working space (typically ~7%). Total useable space may only be partially formatted; any unformatted capacity effectively added to the working space.

As is known in the art, solid-state storage typically "wears out" after a certain number of program/erase cycles on the storage. As the number of program/erase cycles nears the threshold level for the storage media, the data written or retrieved from the storage may contain errors. Furthermore, the log structured sequential writing format of the storage controller 104 prolongs the life of the solid-state storage media 110. As a result, typical solid-state storage media 110 takes years to wear out. Moreover, various "wear-leveling" techniques of storage controllers also act to lengthen the life of solid-state storage media 110. Thus, testing solid-state storage media 110 to the wear-out level is difficult due to the required length of time for the test.

The physical region manager 114, in one embodiment, allows a user to test a solid-state storage device 102 with repeated writing to a focused area on the device in order to wear out the targeted flash cells. This helps to provide independent customer verification of the characteristics of the solid-state storage device 102, such as functionality, performance, reliability, and endurance. In certain embodiments, the physical region manager 114 also provides one or more physical storage regions 112 as autonomous, distinct environments that keep data in a physical storage region 112 separate and independent of data in other physical storage regions 112. In addition, the physical region manager 114, in one embodiment, enforces data security among the physical storage regions 112 and prevents data from one physical storage region 112 from migrating to another physical storage region 112. In another embodiment, the physical region manager 114 allows a user to configure multiple physical storage regions 112 with distinct management policies related to quality of service and management techniques. For example, various wear-leveling techniques may be employed in each physical storage region 112 such that certain storage system attributes, such as security, performance, reliability and endurance may be variously optimized.

The physical region manager 114 greatly reduces the amount of time needed to simulate standard operation of the solid-state storage controller 104 on a subset of the total physical storage capacity on the solid-state storage media. As used herein, standard operation of the storage controller 104 includes memory operations such as reading and writing data, garbage collection, and other operations performed by the solid-state storage controller 104, including management operations, as though the storage controller 104 was operating on the entire solid-state storage media 110, or on the useable portion of the solid-state storage media 110 plus the reserved portion as described above. Memory operations, as used herein, include erase commands, read commands, write commands, and the like. In one embodiment, memory operations include writing a test pattern of data to the solid-state storage media 110. Standard operation may also include indications of the storage controller 104 that the solid-state storage media 110 is worn such that the solid-state storage media is no longer reliable or that the data integrity has fallen below a threshold.

The physical region manager 114 also allows a user to control the environment and operation of the storage controller 104 during testing for non-standard operation. In one embodiment, the physical region manager 114 allows a user to set parameters to enable or disable certain operations of the storage controller 104. For example, a user may deactivate indications from the storage controller 104 that the solid-state storage 110 media is worn.

Non-standard operation may also be advantageously applied to physical storage regions 112 under test, such as related to error and alert thresholds. Such non-standard (or test) operations may enable testing past the typical point of failure so as to acquire improved knowledge about system performance under failure conditions, to provide greater sample sizes of failure events in the face of a reduced population of LEBs under test, and the like.

Consequently, the physical region manager 114 allows customers, reviewers, testing facilities, third-parties, and other users to independently verify reliability and endurance statistics for solid-state storage devices 102 more quickly and efficiently, and with greater control. By controlling standard operation of the solid-state storage controller 104 and focusing this operation into a subset of the total physical storage capacity, a user may simulate standard operation of the entire device, but reach wear-out levels in a fraction of the time needed to wear out the entire storage capacity.

Furthermore, the physical region manager 114, using a plurality of physical storage regions 112, also allows a user to perform various tests on dedicated, independent restricted physical ranges of the total physical storage capacity of the solid-state storage media 110. These tests may be performed simultaneously or in series. In addition, a user may configure the physical region manager 114 with various parameters to perform tests under specific conditions. If standard operation in the physical storage region 112 is not desired, a user may modify operation of the storage controller 104 as desired by way of test parameters and a testing profile and test accordingly.

The system 100 includes one or more computers 116 connected to the solid-state storage device 102. A computer 116 may be a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer 116 may be a client and the solid-state storage device 102 operates autonomously to service data requests sent from the computer 116. In this embodiment, the computer 116 and solid-state storage device 102 may be connected using a computer network, system bus, or other communication means suitable for connection between a computer 116 and an autonomous solid-state storage device 102.

In one embodiment, the system 100 includes one or more clients 118 connected to one or more computer 116 through one or more computer networks 120. A client 118 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 120 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 120 may also include a network from the IEEE 802 family of network technologies, such Ethernet, token ring, WiFi, WiMax, and the like.

The computer network 120 may include servers, switches, routers, cabling, radios, and other equipment used to facilitate networking computers 116 and clients 118. In one embodiment, the system 100 includes multiple computers 116 that communicate as peers over a computer network 120. In another embodiment, the system 100 includes multiple solid-state storage devices 102 that communicate as peers over a computer network 120. One of skill in the art will recognize other computer networks 120 comprising one or more computer networks 120 and related equipment with single or redundant connection between one or more clients 118 or other computer with one or more solid-state storage devices 102 or one or more solid-state storage devices 102 connected to one or more computers 116. In one embodiment, the system 100 includes two or more solid-state storage devices 102 connected through the computer network 120 to a client 118 without a computer 116.

Those of skill in the art recognize that the system 100 may be simpler or more complex than illustrated, so long as the system 100 includes modules or sub-systems that correspond to those described herein.

Figure 2:
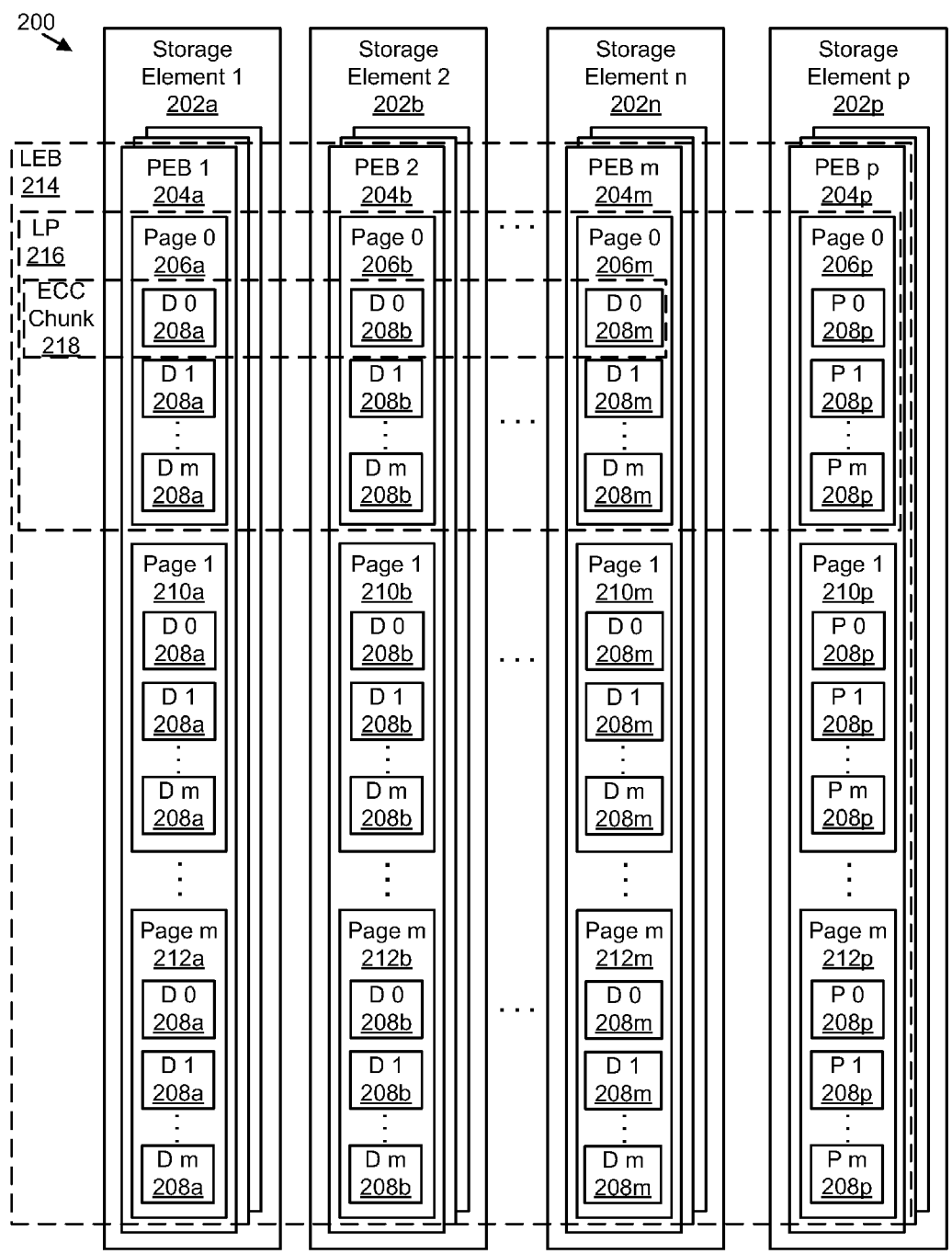
FIG. 2 is a schematic block diagram illustrating one embodiment of an array of storage elements in accordance with the present invention.

FIG. 2 is a schematic block diagram illustrating one embodiment of an array 200 of N+P number of storage elements 202 in accordance with the present invention. The array 200 of storage elements 202 includes N number of storage elements 202a, 202b, . . . 202n and P number of storage elements 202p storing parity data generated from the data stored on the N number of storage elements 202a . . . 202n. The storage element 202 storing parity data 202p may be a dedicated parity storage element 202 that may only store parity data as depicted. In another embodiment, the parity data may be rotated among the storage elements 202.

While a single parity storage element 202p is depicted, one of ordinary skill in the art realizes that a plurality of parity storage elements 202p may be used. Additional parity data may be stored on additional storage elements 202 (not shown) in various forms, such as using complex parity schemes designed to allow data recovery after multiple failures, using simple parity where two or more storage elements 202 have copies of the same parity data, etc. Each storage element 202 may comprise a device, a chip, a portion of a chip, a die, and the like.

Furthermore, in one embodiment each storage element 202 includes a plurality of physical erase blocks ("PEBs") 204. For example, storage element one 202a includes PEB one 204a. A physical erase block is typically an erase block located on one die, chip, or other storage element 202. Each PEB 204 includes m physical pages 206. For example, PEB one includes page zero 206a, page one 210a, . . . page m 212a. Each physical page 206a stores a portion of data and Error Correcting Code ("ECC") distributed with the data ("D") 208. Moreover, the physical pages 206p, 210p, . . . 212p on the parity storage element 202p store parity data 208p.

In one embodiment, a group of PEBs forms an LEB 214. An LEB 214 spans the array of N+P storage elements 200 including the parity storage element 202p. Furthermore, in an embodiment, a logical page ("LP") 216 spans a plurality of physical pages 210 in a row, including the physical pages 210p on the parity storage element 202p. In another embodiment a logical page 216 spans N storage elements 202a-n without the parity storage element 202p such that parity data is stored on the storage element 202p with parity data in a separate step than data is stored in the N storage elements 202a-n.

As described above, in one embodiment, the storage controller 104 sequentially stores data packets in logical page after logical page, typically until an LEB 214 is filled and then across LEB 214 boundaries with the process continuing, LEB 214 after LEB 214.

In one embodiment, the ECC is a block code that is distributed with the data. Furthermore, the data and the ECC may not be aligned to any particular physical hardware boundary. As a result, error correction with the ECC is not dependent on a particular hardware configuration. Therefore, the ECC and corresponding data may form an ECC chunk 218 and the ECC chunk 218 may be divided and stored on one or more of the N storage elements 202a-n. An ECC chunk 218 typically spans at least a portion of a plurality of physical pages 206 of a logical page 216 where the data and ECC generated from the data 208a, 208b, . . . 208m are spread across the N storage elements 202a-n not including the parity data 208p on the parity storage element 202p. The storage element containing parity data 202p may be dynamically rotated among the storage elements comprising the array 200 of storage elements 202. In a preferred embodiment, a LP 216 includes a plurality of ECC chunks 218. A physical page 206 may contain one or more data bytes of the ECC chunk 218. An ECC chunk 218 may span multiple rows within a physical page 206 and a physical page 218 may include a plurality of ECC chunks 218.

As with the ECC chunk 218, in certain embodiments, storage data structures are independent of the physical architecture of the media. Furthermore, stored data may span the boundaries of PEBs 204, LEBs 214, physical pages 206, LPs 216, dies, chips, and the like. In another embodiment, storage data structures do not span LEBs 214.

Figure 3A:
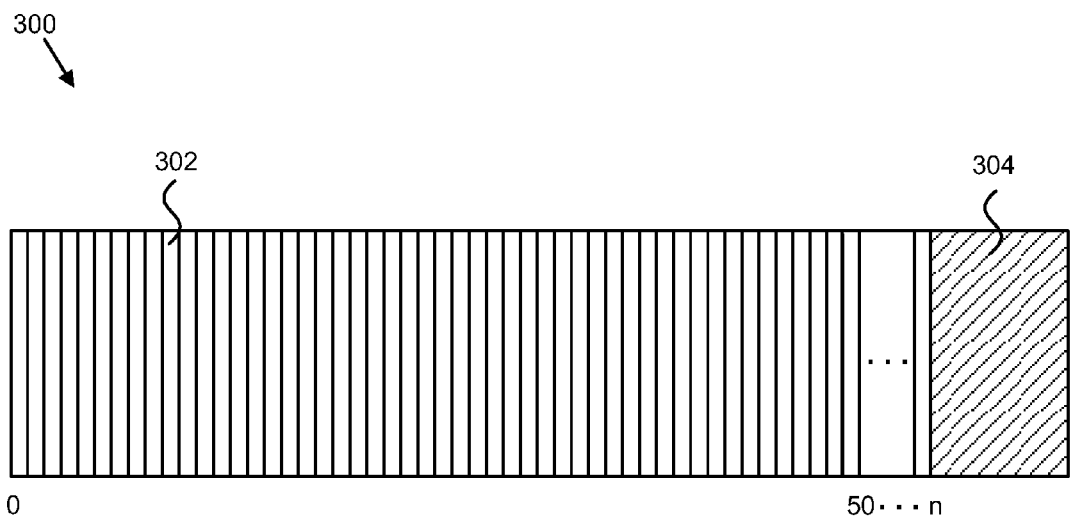
FIG. 3A is a schematic block diagram illustrating one embodiment of Logical Erase Blocks (LEBs) on a solid-state storage device in accordance with the present invention.

FIG. 3A is a schematic block diagram illustrating one embodiment of LEBs 214 on a solid-state storage device 102. Specifically, FIG. 3A depicts the total physical storage capacity on solid-state storage media 300 divided into a plurality of LEBs 302. As used herein, total physical storage capacity includes the storage capacity of solid-state storage media 300 that is available to store data. As described above, the solid-state storage media 300, in certain embodiments, also includes a reserved space 304, or space that is not available for the storage of user/client data. Depending on the implementation, this reserved space may store metadata or other operational information for the solid-state storage device 102. Therefore, in one embodiment, the total physical storage capacity does not include such reserve space 304.

Each LEB 302 may relate to actual physical structures on the solid-state storage media 300. For example, an LEB 302 may correspond to physical cells, physical data packets, physical pages, PEBs, die, chips, arrays, and the like. As the solid-state storage media 300 may be divided into a plurality of LEBs 302 and each LEB 302 may relate to a specific physical area on the solid-state storage media 300, the physical region manager 114 may define a physical storage region 112 based on a set of LEBs 302.

Figure 3B:
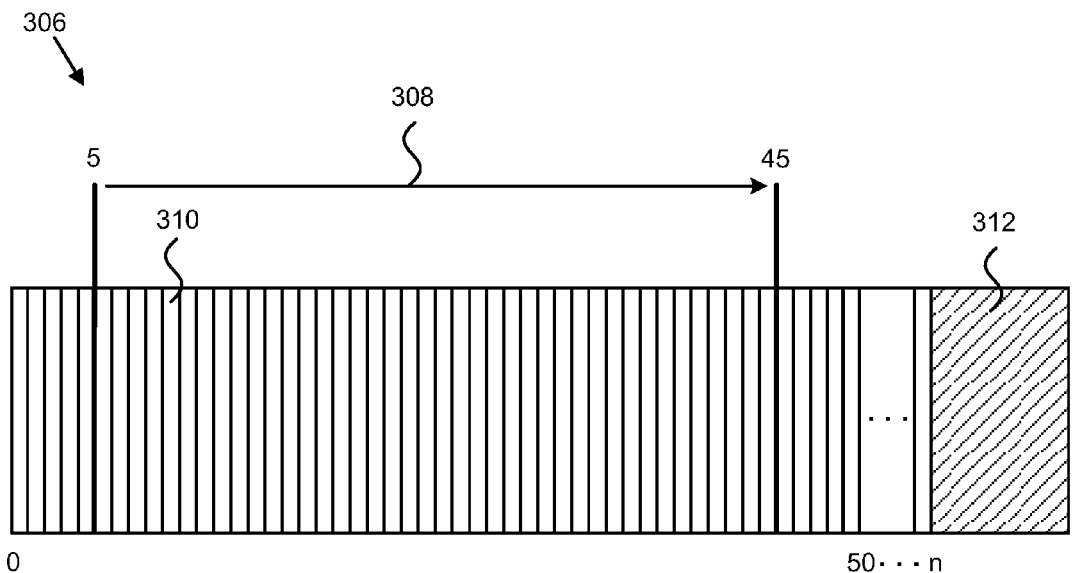
FIG. 3B is a schematic block diagram illustrating another embodiment of Logical Erase Blocks (LEBs) on a solid-state storage device in accordance with the present invention.

FIG. 3B is a schematic block diagram illustrating another embodiment of LEBs 310 on a solid-state storage device 102 with a physical storage region 308 defined using a set or range of LEBs 310. In one embodiment, the LEBs 310 of the physical storage region 308 may be organized into a linked list, a set of contiguous LEBs 310 in a physical order, and the like. In one embodiment, the physical storage region 308 is defined using a base plus offset notation. For example, the storage controller 104 that typically references LEBs 310 using an offset from a base value may be provided a certain base value that serves as a boundary to the physical storage region 308. The storage controller 104 may then use the LEBs 310 up to the offset value as the physical storage region 308. Furthermore, the physical region manager 114 may use existing logical structures, such as LEBs 310, to define a physical storage region 308 and the logical structures in turn, may relate to a specific physical area or capacity of the solid-state storage media 306. In another embodiment, as described in greater detail below, a physical storage region 308 is directly defined using physical structures of the solid-state storage media 306.

Figure 4:
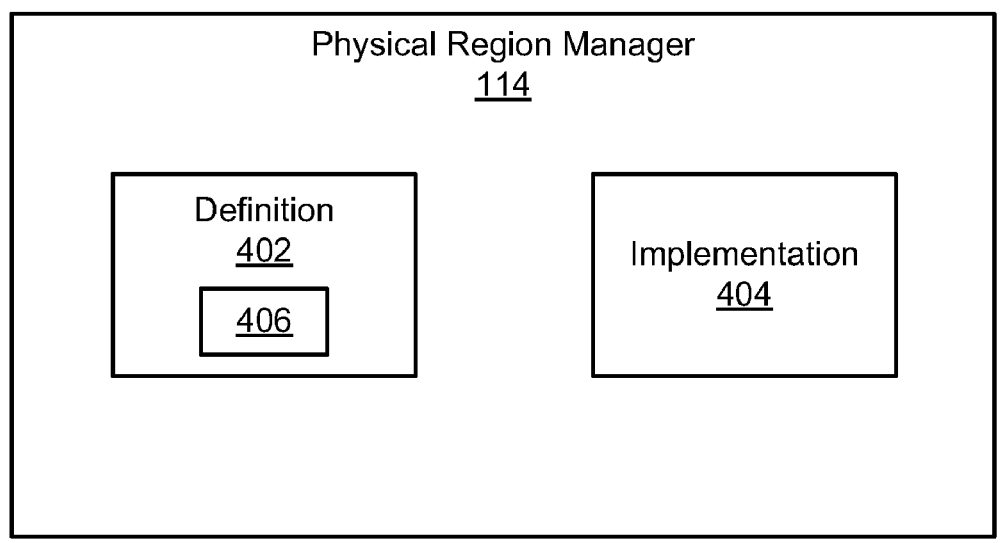
FIG. 4 is a schematic block diagram illustrating one embodiment of an apparatus for managing physical regions in a solid-state storage device in accordance with the present invention.
Figure 4:
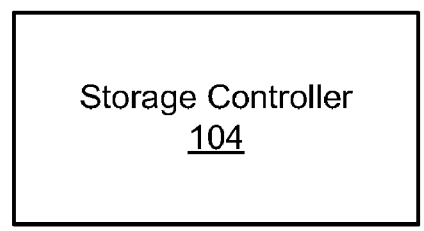

FIG. 4 illustrates one embodiment of an apparatus 400 for managing physical regions in a solid-state storage device 102. The apparatus 400 depicts one embodiment of the physical region manager 114 with the storage controller 104 and includes a definition module 402 with a physical storage region definition 406, an implementation module 404, and the storage controller 104, which are described below.

The definition module 402 defines and configures one or more physical storage regions 112. In one embodiment, the definition module 402 defines a physical storage region 112 on solid-state storage media 110 of a solid-state storage device 102. As described above, the physical storage region 112 is a subset of total physical storage capacity on the solid-state storage media 110. The definition module 402 may define a physical storage region 112 based on a user-selected capacity requirement. For example, a user may require a subset of 10% total physical storage capacity for a physical storage region 112. In another embodiment, the definition module 402 may have pre-defined physical storage regions 112.

In one embodiment, the definition module 402 determines a physical storage region definition 406 that defines each physical storage region 112. In one embodiment, the physical storage region definition 406 includes metadata to indicate characteristics of the physical storage region 112 such as a physical location on the storage media, storage capacity information, identification information, device behavior related to the physical storage region 112, and the like. For example, the physical storage region definition 406 may specify device behavior such as data writing modes including multi-level cell ("MLC") mode and single-level cell ("SLC") mode, maintenance operation configuration such as garbage collection and wear leveling, and various system management policies regarding scrubbing, scanning, grooming, preemption, error thresholds, and the like.

In one embodiment, the physical storage region definition 406 includes information about the status and operational data of the solid-state storage device 102 within the physical storage region 112 corresponding to the physical storage region definition 406. Moreover, the physical storage region definition 406, in one embodiment, contains an index that maps logical identifiers to physical addresses of data stored in a physical storage region 112. In addition, in one embodiment, a solid-state storage device 102 may contain multiple physical storage region definitions 406 and multiple physical storage regions 112. This allows a user to set up various testing conditions as will be discussed below.

As described above, a physical storage region 112 may be defined by logical structures such as set of LEBs 214. In other embodiments, the physical storage region 112 may be defined by device identifiers, channel identifiers, bank identifiers, chip identifiers, erase block identifiers, page identifiers, offset identifiers or any combination thereof. Therefore, the physical storage region definition 406 may include identifiers that identify physical or logical boundaries of the physical storage region 112.

Furthermore, the physical storage region 112 may be represented by one or more physical storage region units that are abstract units to represent and measure storage capacity of the physical storage region 112. In one embodiment, each physical storage region unit relates to one or more LEBs 214. In another embodiment, each physical storage unit corresponds to physical structures on the solid-state storage media 110.

By dividing a physical storage region 112 into physical storage region units, the definition module 402 allows a user greater control over management of the physical storage region 112 and greater flexibility, in certain embodiments, in testing. Furthermore, the use of a physical storage region unit allows a vendor to abstract and hide the exact physical dimensions and specifications of the physical storage region 112 from the user. Therefore, in one embodiment, the storage capacity of a physical storage region unit is defined by a solid-state storage vendor and unknown to a user of the solid-state storage device 102.

A user may perform testing on an entire physical storage region 112 including on all of its physical storage region units. Conversely, the user may perform testing on a subset of the physical storage region units for a physical storage region. In addition, a user may perform testing on multiple physical storage regions 112 concurrently.

In one embodiment, the definition module 402 defines one or more additional physical storage regions 112 on the solid-state storage media 110 of the solid-state storage device 102. Each additional physical storage region 112 is a distinct subset of the total physical storage capacity on the solid-state storage media 110. Therefore, the definition module 402 may define a plurality of physical storage regions 112 that are independent subsets of the total physical storage capacity of the solid-state storage media 110.

The implementation module 404 sets up, implements, and/or enforces the physical storage region 112 to ensure that memory operations within the physical storage region 112 are bounded to the physical storage region 112. In one embodiment, the implementation module 404 implements the physical storage region definition 406 with respect to the storage controller 104 for the solid-state storage media 110. In one embodiment, the implementation module 404 interfaces with the storage controller 104 to enforce the physical storage region 112. In another embodiment, the implementation module 404 resides in the storage controller 104 and modifies the behavior of the storage controller 104.

The implementation module 404, in one embodiment, enforces the physical storage definition 406 by setting parameters and metadata to allow the storage controller 104 to perform memory operations within the physical storage region 112 such that the memory operations are bounded to the physical storage region 112. For example, the implementation module 404 may provide a predefined, fixed set of LEBs 214 to the storage controller 104 within which to operate. The storage controller 104, in this embodiment, is unaware that the set of LEBs 214 does not include all of the possible LEBs 214 on the solid-state storage media 110 and the storage controller 104 performs standard operations on the provided set of LEBs 214 as if the storage controller 104 operates within the entire solid-state storage media 110. As mentioned above, standard operations includes reading and writing data, garbage collection, formatting and initialization, and other operations as if the storage controller 104 was operating on the entire solid-state storage media 110.

In another embodiment, the implementation module 404 enforces the physical storage region definition 406 with respect to the storage controller 104 by actively guiding the storage controller 104 to redirect memory operations to the physical storage region 112 rather than other physical locations not defined within the physical storage region 112. For example, the implementation module 404 may modify the physical to logical mapping to redirect memory operations to a location within the physical storage region 112. In one embodiment, the implementation module 404 modifies the physical mapping entries in the physical to logical mapping such that the modified physical mapping entries direct the storage controller 104 to locations within the physical storage region 112. One skilled in the art realizes the variety of ways in which the implementation module 404 may enforce the physical storage region definition 406.

The storage controller 104 performs memory operations within the physical storage region 112 such that the memory operations are bounded to the physical storage region 112. By bounding the memory operations within the physical storage region 112, a user may perform tests on a focused area of the solid-state storage media 110 as described above to decrease wear time. Furthermore, a user may perform a plurality of independent tests in a plurality of physical storage regions 112, each with bounded memory operations. Bounded memory operations also allow for data security and multi-user scenarios.

In one embodiment, the storage controller 104 operates within each physical storage region 112 as if the storage controller 104 was operating within the total physical storage capacity of the solid-state storage media 110. In this manner, a test performed on a physical storage region 112 may more closely approximate functionality and behavior of operations on the entire solid-state storage device 102 depending on whether the storage capacity of the physical storage region 112 is statistically significant as is described in greater detail below.

In one embodiment, the storage controller 104 maintains one or more logs and metadata stored in the solid-state storage device 102. These logs may include a logical to physical index log, a test log, an error log, a retirement unit history log, a context change log, or any combination thereof. Furthermore, the logical to physical index log may contain information regarding the logical to physical index, the test log may contain information regarding the test, and the error log may contain information regarding storage errors or other errors signaled by the solid-state storage device 102. The retirement unit history log may contain information regarding units, or regions of the solid-state storage that have been retired, or withdrawn from operation by the solid-state storage device 102. Finally, the context change log may contain information about the various physical storage region definitions 406 and the changes made to these physical storage region definitions 406 during the operation of the solid-state storage device 102.

The logs may be stored at a physical location inside the physical storage region 112 or at a physical location outside the physical storage region 112. For a more complete simulation of device operating conditions, the logs may be stored inside the physical storage region 112. However, a user may wish to test a physical storage region 112 without risking the log information to possible data corruption and choose to store the logs outside the physical storage region 112.

Figure 5:
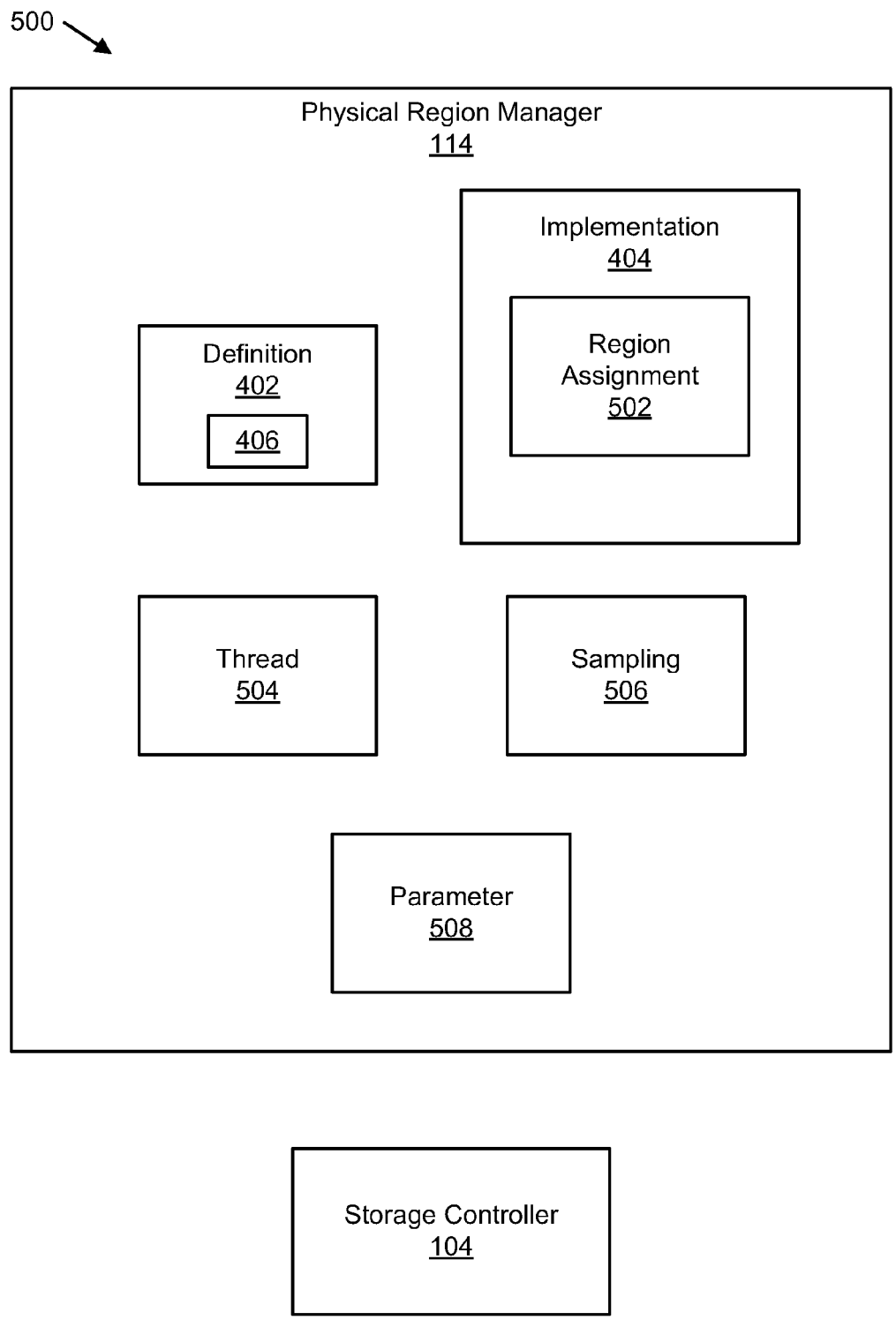
FIG. 5 is a detailed schematic block diagram illustrating another embodiment of an apparatus for managing physical regions in a solid-state storage device in accordance with the present invention.

FIG. 5 illustrates another embodiment of an apparatus 500 for managing physical regions in a solid-state storage device 102 and the storage controller 104. The apparatus 500 includes the definition module 402 with the physical storage region definition 406 and the implementation module 404, wherein these modules include substantially the same features as described above in relation to FIG. 4. Additionally, the implementation module 404 includes a region assignment module 502 and the apparatus 500 includes a thread module 504, a sampling module 506, and a parameter module 508.

In one embodiment, the region assignment module 502 assigns, inputs, or provides the physical storage region 112 to the storage controller 104. The region assignment module 502, in one embodiment, sets the parameters and metadata to allow the storage controller 104 to perform memory operations within the physical storage region 112 such that the memory operations are bounded to the physical storage region 112. For example, the implementation module 404 may provide a set of LEBs 214 to the storage controller 104 within which to operate. The implementation module 404 may also provide a base value for the storage controller 104 to use with a base plus offset calculation. The storage controller 104, in this embodiment, is unaware that the set of LEBs 214 does not include all of the LEBs 214 that could be made available on the solid-state storage media 110 and the storage controller 104 performs standard operations on the provided set of LEBs 214 as if the storage controller 104 operates within the entire solid-state storage media 110.

Advantageously, this allows the implementation module 404 to work with a variety of storage controllers 104 with further modification to the storage controller 104. This may also provide realistic testing as a non-modified storage controller 104 is used to perform operations in the physical storage region 112.

The thread module 504 facilitates testing and simultaneous operation in one or more physical storage regions 112. In one embodiment, the thread module 504 initiates an autonomous set of memory operations within each of the physical storage regions 112. As used herein, autonomous memory operations are memory operations that are independent of memory operations in other physical storage regions. Therefore, the operations in one physical storage region 112 do not impact the operations in another physical storage region 112. Furthermore, solid-state storage device 102 maintenance operations and storage recovery operations such as garbage collection are also independent from physical storage region 112 to physical storage region 112 with autonomous memory operations.

The thread module 504 may initiate one or more software threads to perform the memory operations. In one embodiment, a single thread performs memory operations on two or more physical storage regions 112. In another embodiment, a single thread performs memory operations on a single physical storage region 112 and likewise a plurality of threads may perform memory operations on a plurality of physical storage regions 112 in a one-to-one relationship. A user may configure each software thread to perform different memory operations or initiate memory operations under different conditions, thus testing the various physical storage regions 112 with distinct tests. For example, a user may run multiple software threads, each thread can work to reach a certain number of program/erase cycles, each thread may test using different versions of a device driver, each thread may use different wear leveling algorithms, each thread can write a different testing pattern, each thread may execute a different type of workload, and the like. Furthermore, using a plurality of threads with a plurality of physical storage regions 112 also allows data to be segregated into different autonomous regions in memory for security or other reasons.

The sampling module 506 ensures that the physical storage region is of sufficient size for accurate test results and/or proper operation. In one embodiment, the sampling module 506 determines that physical storage capacity of the physical storage region 112 is statistically significant with respect to the total physical storage capacity. In one embodiment, the sampling module determines if the physical storage region 112 is of a sufficient minimum size to allow for storage controller 104 operations such as garbage collection and wear-leveling and to allow for metadata overhead so as to more closely approximate results as if the total physical storage memory was tested. In one embodiment, the sampling module 506 uses a predetermined storage capacity threshold to determine that physical storage capacity of the physical storage region 112 is statistically significant with respect to the total physical storage capacity. In another embodiment, the sampling module 506 determines whether the physical storage capacity of the physical storage region 112 is statistically significant with respect to the total physical storage capacity dynamically based on size requirements of storage controller 104 operations and other overhead.

In one embodiment, the parameter module 508 manages one or more parameters for the physical storage region 112. Managing parameters may include initially setting the parameters before the storage controller performs operations on the physical storage region 112. Managing parameters may also include enforcing parameters while the storage controller performs operations on the physical storage region 112. The parameters may include security parameters, quality of service parameters, and performance parameters. Furthermore, the parameter module 508 may manage parameters in a plurality of physical storage regions 112. In one embodiment, a user and/or the storage controller 104 may configure each physical storage region 112 with different parameter values to create autonomous, distinct environments. For example, using security parameters, the parameter module 508 may prevent data from one physical storage region 112 from migrating to another physical storage region 112. For example, the parameter module 508 may enforce certain rules for each physical storage region 112 to facilitate a secure multi-user implementation. The parameter module 508 may also implement a "secure erase" command to erase the data in a physical storage region 112 such that the data is unrecoverable without affecting other physical storage regions 112.

In one embodiment, the parameter module 508 includes parameters to configure one physical storage region 112 to operate in MLC mode and another to operate in SLC mode. One of skill in the art realizes the variety of parameters that the parameter module 508 may use to configure each physical storage region 112.

Figure 6:
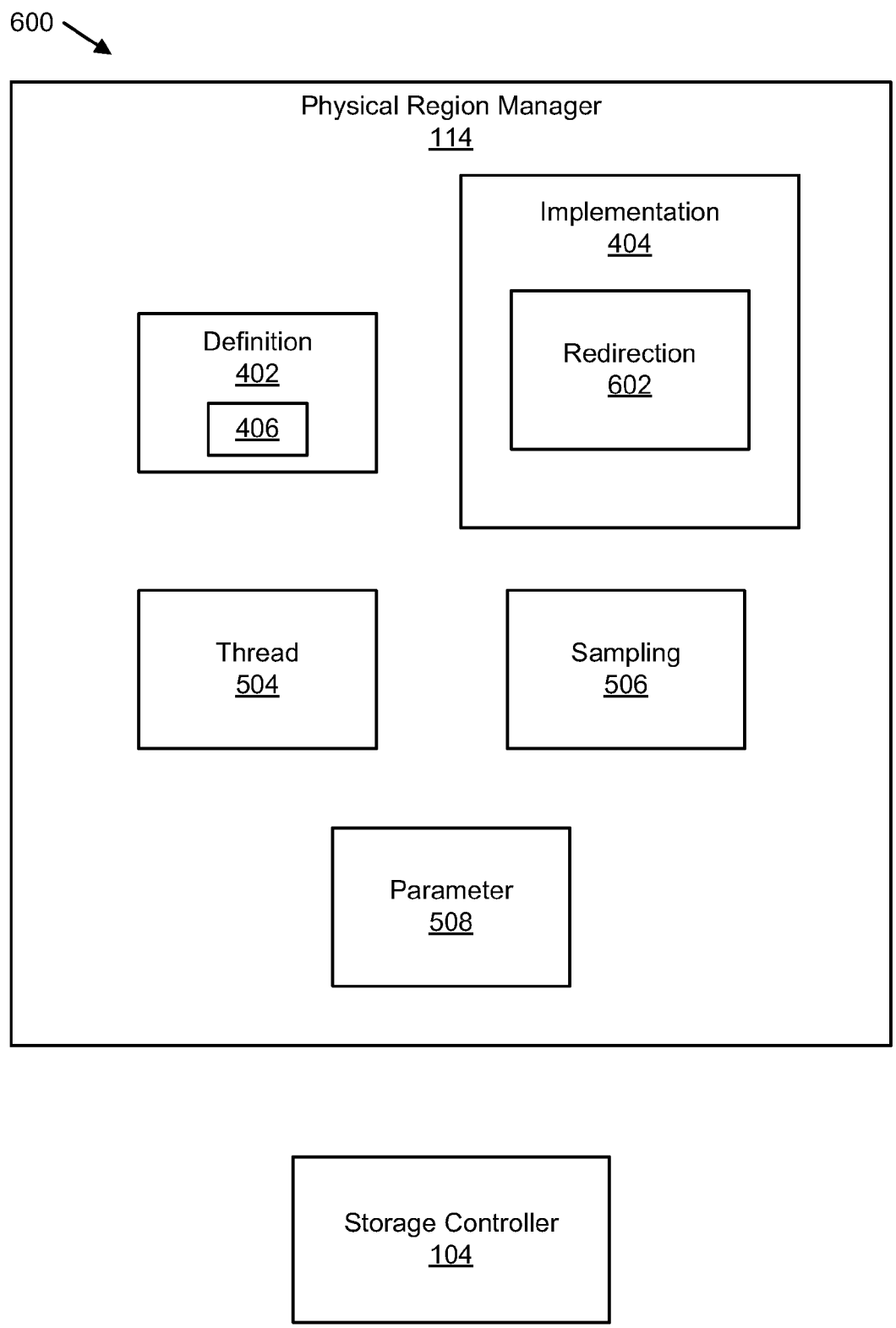
FIG. 6 is a detailed schematic block diagram illustrating another embodiment of a apparatus for managing physical regions in a solid-state storage device in accordance with the present invention.

FIG. 6 illustrates another embodiment of an apparatus 500 for managing physical regions in a solid-state storage device 102 and the storage controller 104. The apparatus 500 includes the definition module 402 with the physical storage region definition 406, the implementation module 404, the thread module 504, the sampling module 506, and the parameter module 508 wherein these modules include substantially the same features as described above in relation to FIGS. 4 and 5. In addition, the implementation module 404 includes a redirection module 602.

The redirection module 602 actively interfaces with the storage controller 104 to enforce the physical storage region 112. In one embodiment, the redirection module 602 redirects memory operations to the physical storage region 112 or otherwise actively guides the storage controller 104 to redirect memory operations to the physical storage region 112. The redirection module 602 may modify a physical to logical mapping to redirect physical addresses for memory operations from an original physical memory address that does not satisfy the physical storage region definition 406 to a physical location that does satisfy the physical storage region definition 406, falls inside the bounds of the physical storage region 112. In one embodiment, the redirection module 602 modifies the physical mapping entries in the physical to logical mapping such that the modified physical mapping entries direct the storage controller 104 to locations within the physical storage region 112. For example, if the solid-state storage media 110 includes a plurality of physical storage regions 112, the redirection module 602 may redirect each memory operation to its corresponding physical storage region 112. The redirection module 602 may determine the corresponding physical storage region 112 depending on which client originated the memory operation.

The redirection module 602, in one embodiment, is separate from the storage controller 104 and interfaces with the storage controller 104. In another embodiment, the redirection module 602 is part of the storage controller 104 and modifies the behavior of the storage controller 104.

Figure 7:
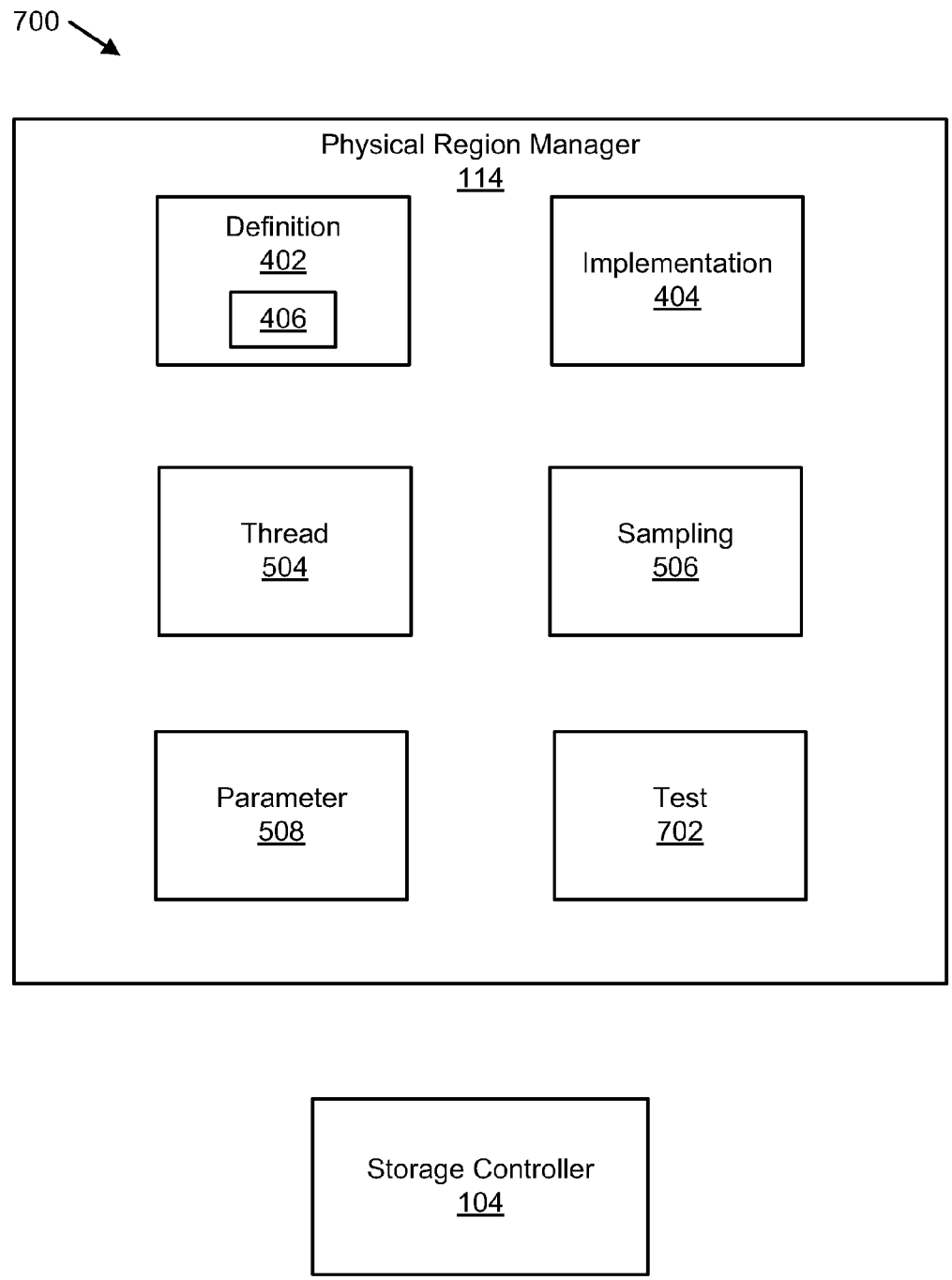
FIG. 7 is a detailed schematic block diagram illustrating yet another embodiment of an apparatus for managing physical regions in a solid-state storage device in accordance with the present invention.

FIG. 7 illustrates yet another embodiment of an apparatus 700 for managing physical regions in a solid-state storage device 102. The apparatus 700 includes the definition module 402 with the physical storage region definition 406, the implementation module 404, the thread module 504, the sampling module 506, and the parameter module 508 wherein these modules include substantially the same features as described above in relation to FIGS. 4 and 5. In addition, the apparatus 700 includes a test module 702.

The test module 702 configures, initiates, and analyzes tests on one or more physical storage regions 112. The test module 702 may determine a number of physical storage regions 112 to use for a test and configure that number of physical storage regions 112. The test module 702 may also receive a user input with a number of physical storage regions 112 for the test module 702 to initialize or a selected physical storage region 112.

In one embodiment, the test module 702 exercises the physical storage regions 112 by performing memory operations on the physical storage regions 112. The test module 702 may work with the thread module 504 and initiate one or more software threads to perform an autonomous set of memory operations within each of the physical storage regions 112. The test module 702, in one embodiment, exercises the physical storage regions 112 according to a testing profile. The testing profile may include testing parameters, selected physical storage regions 112, length of time for each test, memory operations to perform in each physical storage region 112, and the like.

In one embodiment, each of the software threads performs memory operations according to the testing profile. The testing profile may specify a number of operations, type of operations, a host driver, wear leveling algorithm, data write pattern, and/or workload for each thread.

For example, the testing profile may allow a user to specify specific testing procedures such as performing a full write of the physical storage region 112, marking the data as invalid using a command such as a TRIM command that explicitly notifies the storage controller 104 that data does not need to be preserved, and then performing another full write of the physical storage region 112 so that garbage collection does not slow down the test. A user may also specify that the test module 702 disables certain wear-leveling operations such as those that move cold data to hot data areas to reduce write amplification and avoid tying up a data bus of the solid-state storage device 102.

In one embodiment, the test module 702 determines data integrity in the physical storage region 112. In certain embodiments, the test module 702 determines data integrity by writing a pattern in the physical storage region 112 and then reading the physical storage region 112 to compare the original pattern to the read-back pattern. The test module 702 may log the errors detected in the read-back pattern caused by failed bits and by write or read disturbs.

In one embodiment, the test module 702 extrapolates the data integrity in the physical storage region 112 to the total physical storage capacity on the solid-state storage media 110. Therefore, the results from one of more physical storage regions 112 may approximate the wear on the entire media without the time required to actually wear-out the capacity of an entire solid-state storage media 110.

Figure 8:
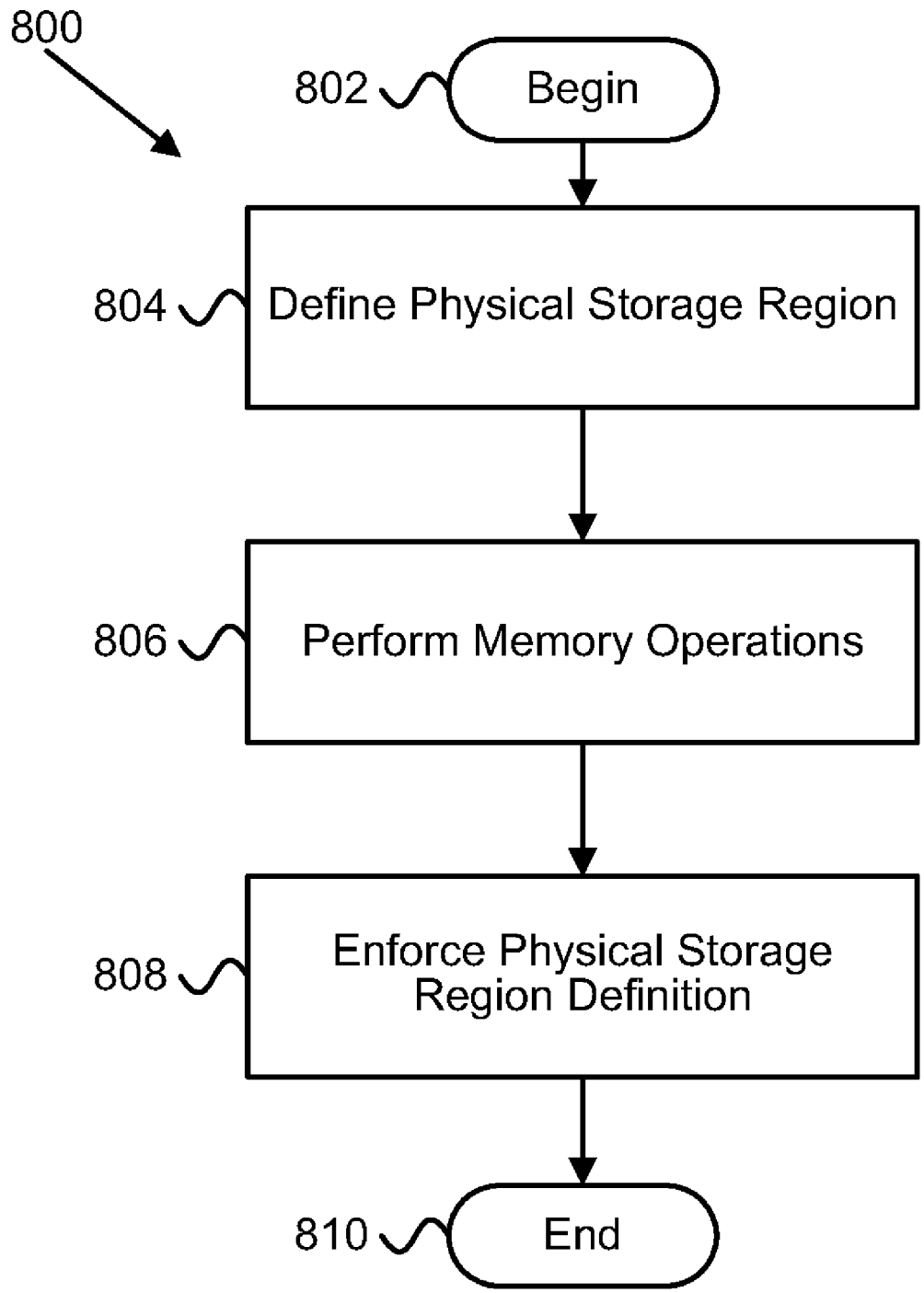
FIG. 8 is a schematic flow chart diagram illustrating one embodiment of a method for managing physical regions in a solid-state storage device in accordance with the present invention.

FIG. 8 is a schematic flow chart diagram illustrating one embodiment of a method 800 for managing physical regions in a solid-state storage device 102. The method 800 may also be implemented by the executed operations of a computer program product. The method 800 begins 802 and the definition module 402 defines 804 a physical storage region 112 on solid-state storage media 110 of a solid-state storage device 102. The physical storage region 112 is a subset of total physical storage capacity on the solid-state storage media 110. The storage controller 104 performs 806 memory operations within the physical storage region 112 and the memory operations are bounded to the physical storage region 112. The implementation module 404 enforces 808 the physical storage region definition 406 with respect to the storage controller 104 for the solid-state storage media 110. The implementation module 404 may enforce 808 the physical storage region definition 406 by configuring a subset of the total physical storage capacity and allowing the storage controller to operate within the subset. In the alternative, the implementation module 404 may enforce 808 the physical storage region definition 406 by actively redirecting memory operations to the physical storage region 112. Then, the method 800 ends 810.

Figure 9:
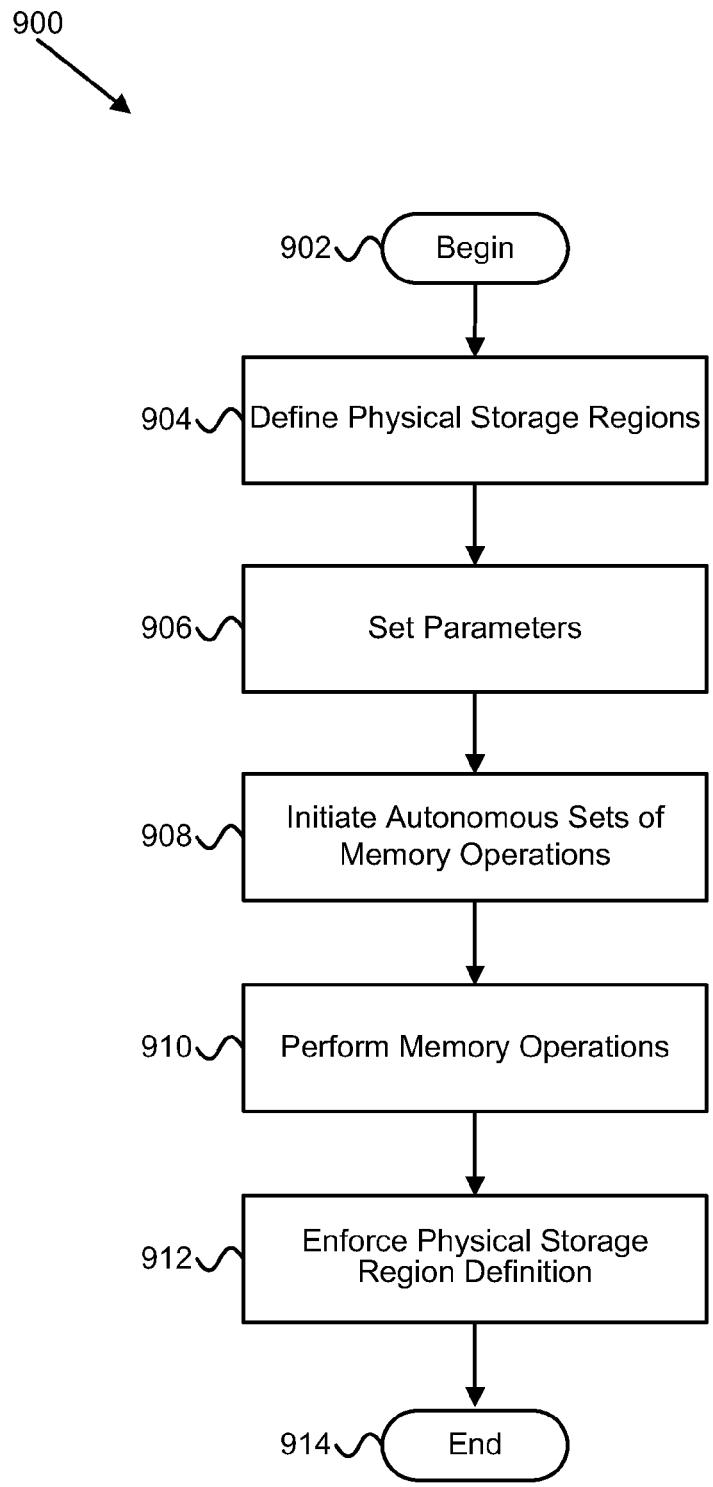
FIG. 9 is a detailed schematic flow chart diagram illustrating another embodiment of a method for managing physical regions in a solid-state storage device in accordance with the present invention.

FIG. 9 is a schematic flow chart diagram illustrating another embodiment of a method 900 for managing physical regions in a solid-state storage device 102. The method 900 may be implemented by the executed operations of a computer program product. The method 900 begins 902 and the definition module 402 defines 902 physical storage regions 112 on solid-state storage media 110 of a solid-state storage device 102. The parameter module 508 sets 906 one or more parameters for each physical storage region 112. Parameters may include security parameters, quality of service parameters, features of the storage controller 104 to enable/disable, and the like. Next, the thread module 504 initiates 908 an autonomous set of memory operations within each of the physical storage regions 112. The thread module 504 may initiate a software thread to perform memory operations in each physical storage region 112. The storage controller 104 performs 910 memory operations within the physical storage region 112. The memory operations from each set of autonomous memory operations are bound to the corresponding physical storage region 112.

The implementation module 404 enforces 912 the physical storage region definitions 406 with respect to the storage controller 104 for the solid-state storage media 110. In one embodiment, the implementation module 404 includes a redirection module 602 that actively interfaces with the storage controller 104 to enforce the physical storage region 112. In another embodiment, the implementation module 404 includes a region assignment module 502 that assigns, inputs, or provides the physical storage region 112 to the storage controller 104. Then the method 900 ends 914.

Figure 10:
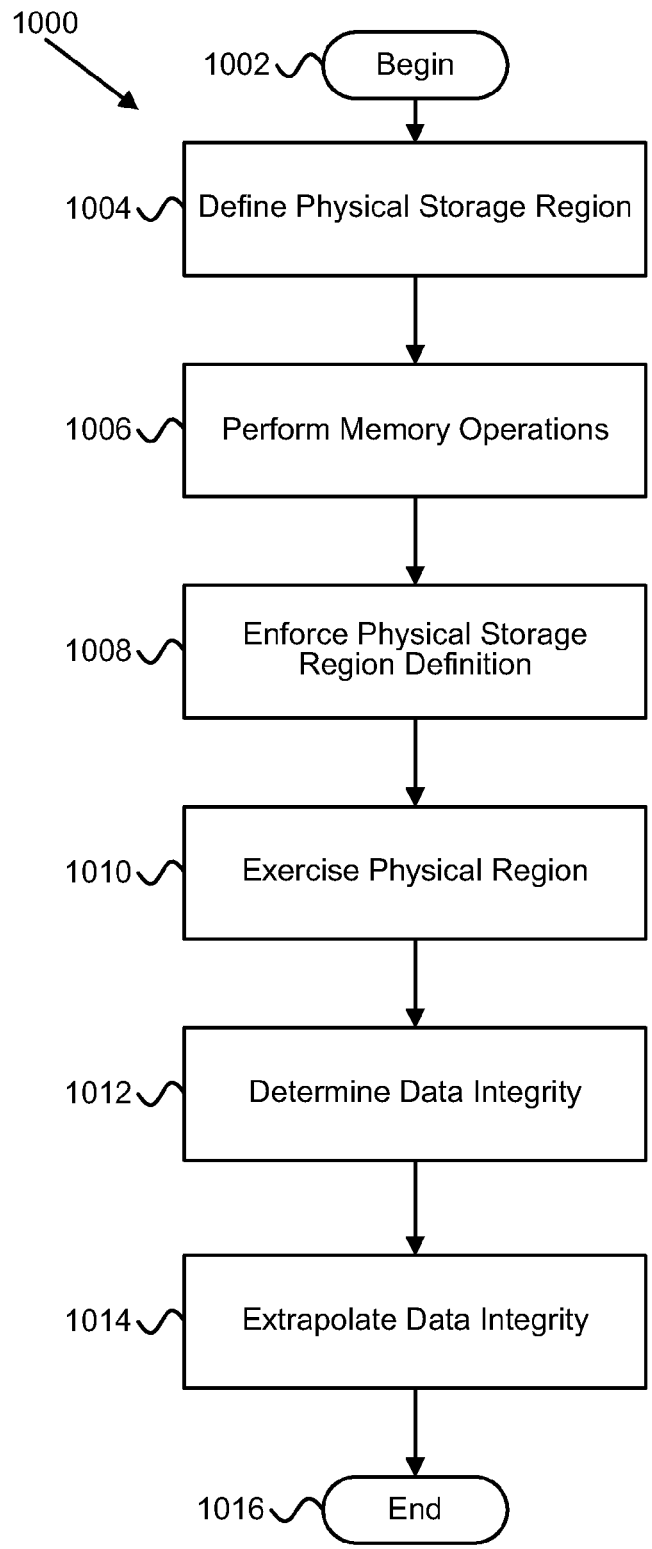
FIG. 10 is a detailed schematic flow chart diagram illustrating yet another embodiment of a method for managing physical regions in a solid-state storage device in accordance with the present invention.

FIG. 10 is a schematic flow chart diagram illustrating yet another embodiment of a method 1000 for managing physical regions in a solid-state storage device 102. The method 1000 begins 1002 and the definition module 402 defines 1004 a physical storage region 112 on solid-state storage media 110 of a solid-state storage device 102. The physical storage region 112 is a subset of total physical storage capacity on the solid-state storage media 110. The storage controller 104 performs 1006 memory operations within the physical storage region 112 that are bounded to the physical storage region 112. The implementation module 404 enforces 1008 the physical storage region definition 406 with respect to the storage controller 104 for the solid-state storage media 110.

Next, the test module 702 exercises 1010 the physical storage region by performing memory operations on the physical storage region 112. Exercising may include performing workloads designed to simulate standard operation, workloads designed to accelerate operation, and/or continuous operations to simulate "worst case" wear. The test module 702 may exercise 1010 the physical storage region 112 by initiating one or more software threads to perform an autonomous set of memory operations within each of the physical storage regions 112. The test module 702 then determines 1012 data integrity in the physical storage region 112. Finally, the test module 702 extrapolates 1014 the data integrity in the physical storage region 112 to the total physical storage capacity on the solid-state storage media to approximate the test results for the entire media. Then, the method 1000 ends 1016.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing physical regions in a solid-state storage device, the apparatus comprising:
    a definition module configured to define a physical storage region on solid-state storage media of a solid-state storage device, the physical storage region comprising a subset of total physical storage capacity on the solid-state storage media;
    a storage controller configured to perform memory operations within the physical storage region such that the memory operations are bounded to the physical storage region; and an implementation module configured to implement the physical storage region definition with respect to the storage controller for the solid-state storage media by redirecting memory operations for the solid-state storage device from a physical memory location outside the physical storage region to a physical memory location inside the physical storage region, wherein the definition module and the implementation module comprise one or more of logic hardware and executable code, the executable code stored on a computer readable storage medium.

2. The apparatus of claim 1, wherein the definition module is further configured to define one or more additional physical storage regions on the solid-state storage media of the solid-state storage device, each additional physical storage region comprising a distinct subset of the total physical storage capacity on the solid-state storage media.

3. The apparatus of claim 2, further comprising a thread module configured to initiate an autonomous set of memory operations within each of the physical storage region and the one or more additional physical storage regions.

4. The apparatus of claim 1, wherein the storage controller is further configured to sequentially write data on the solid-state storage media in a log structured format, the data sequentially stored on the solid-state storage media.

5. The apparatus of claim 1, wherein the implementation module further comprises a region assignment module that assigns the physical storage region to the storage controller.

6. The apparatus of claim 1, wherein the physical storage region comprises a set of logical erase blocks, each logical erase block referenced by the storage controller.

7. The apparatus of claim 1, further comprising a sampling module configured to determine that physical storage capacity of the physical storage region satisfies a predetermined storage capacity threshold with respect to the total physical storage capacity.

8. The apparatus of claim 1, further comprising a parameter module configured to manage one or more parameters for the physical storage region, wherein the parameters comprise one or more of security parameters, quality of service parameters, and performance parameters.

9. A method for managing physical regions in a solid-state storage device, the method comprising:
defining a physical storage region on NAND flash storage media of a NAND flash storage device, the physical storage region comprising a subset of total physical storage capacity on the NAND flash storage media;
performing, by way of a storage controller, memory operations within the physical storage region such that the memory operations are bounded to the physical storage region; and
enforcing the physical storage region definition with respect to the storage controller for the NAND flash storage media by redirecting memory operations for the solid-state storage device from a physical memory location outside the physical storage region to a physical memory location inside the physical storage region.

10. The method of claim 9, further comprising defining one or more additional physical storage regions on the NAND flash storage media of the NAND flash storage device, each additional physical storage region comprising a distinct subset of the total storage capacity on the NAND flash storage media, and further comprising initiating an autonomous set of memory operations within each of the physical storage regions and the one or more additional physical storage regions.

11. The method of claim 9, wherein the storage controller is configured to sequentially write data on the solid-state storage media in a log structured format, the data sequentially stored on the NAND flash storage media.

12. The method of claim 9, wherein enforcing the physical storage region definition further comprises assigning the physical storage region to the storage controller.

13. The method of claim 9, wherein the physical storage region comprises a set of logical erase blocks, each logical erase block defined by the NAND flash controller, each logical erase block spanning two or more NAND flash media chips.

14. A method for managing physical regions in a solid-state storage device, the method comprising:
defining a physical storage region on NAND flash storage media of a NAND flash storage device, the physical storage region comprising a subset of total physical storage capacity on the NAND flash storage media;
performing, by way of a storage controller, memory operations within the physical storage region such that the memory operations are bounded to the physical storage region, wherein the memory operations comprise one or more of erase commands, read commands, and write commands;
enforcing the physical storage region definition with respect to the storage controller for the NAND flash storage media;
exercising the physical storage region by performing memory operations on the physical storage region; and
determining data integrity of the physical storage region, the data integrity based on a determined number of errors.

15. The method of claim 14, further comprising extrapolating data integrity of the total physical storage capacity on the NAND flash storage media based on the data integrity in the physical storage region.

16. The method of claim 14, further comprising defining one or more additional physical storage regions on the NAND flash storage media of the NAND flash storage device, each additional physical storage region comprising a distinct subset of the total physical storage capacity on the NAND flash storage media.

17. The method of claim 16, further comprising initiating one or more software threads to perform an autonomous set of memory operations within each of the physical storage region and the one or more additional physical storage regions.

18. The method of claim 17, wherein each of the software threads performs memory operations according to a testing profile, the testing profile specifying one or more of a number of operations, type of operations, host driver, wear leveling algorithm, data write pattern, and workload.

19. An apparatus for managing physical regions in a solid-state storage device, the apparatus comprising:
a definition module configured to define a physical storage region on solid-state storage media of a solid-state storage device, the physical storage region comprising a subset of total physical storage capacity on the solid-state storage media;
a storage controller configured to test wear of solid-state storage media associated with the physical storage region by performing memory operations within the physical storage region such that the memory operations are bounded to the physical storage region; and
an implementation module configured to implement the physical storage region definition with respect to the storage controller for the solid-state storage media.

* * * * *

UNITED STATES PATENT AND TRADEMARK OFFICE
CERTIFICATE OF CORRECTION

PATENT NO. : 8,275,933 B2  Page 1 of 1
APPLICATION NO. : 12/616112
DATED : September 25, 2012
INVENTOR(S) : David Flynn et al.

It is certified that error appears in the above-identified patent and that said Letters Patent is hereby corrected as shown below:

On the title page, item 73, Assignee: "Fusion-10, Inc." should read --Fusion-io, Inc.--

Signed and Sealed this
Twenty-fifth Day of December, 2012

David J. Kappos
*Director of the United States Patent and Trademark Office*